April 12, 1960 B. EPSZTEIN 2,932,760

BACKWARD FLOW TRAVELLING WAVE OSCILLATORS

Filed April 9, 1952

INVENTOR

BERNARD EPSZTEIN

BY Haseltine Lake & Co.,

AGENTS

United States Patent Office 2,932,760

Patented Apr. 12, 1960

2,932,760

BACKWARD FLOW TRAVELLING WAVE DEVICES

Bernard Epsztein, Paris, France, assignor to Compagnie Generale de Telegraphie Sans Fil, a corporation of France Application April 9, 1952, Serial No. 281,347

Claims priority, application France April 13, 1951

15 Claims. (Cl. 315—3.5)

Figure 1:
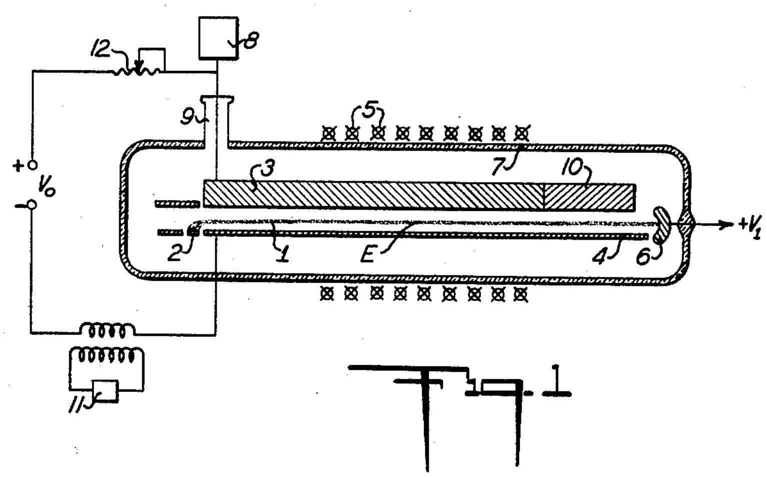

The present invention relates to ultra high frequency oscillators.

Present day medium and high power ultra high frequency oscillators are generally of the klystron or magnetron type. Klystrons are capable of providing substantial energy, but their efficiency is not high and their tuning band is extremely narrow. It is only by employing mechanical tuning devices providing changes in the volume of cavity resonators that frequency variations of some 25% may be obtained. Magnetrons have a good efficiency, but the tuning possibilities are poor and involve substantial complications. Both for klystrons and for magnetrons, good matching of the load is necessary for good efficiency.

It is an object of the present invention to provide an ultra high frequency oscillator which avoids the disadvantages of the above devices, while combining their known advantages. In other words, the oscillator according to the present invention is designed preferably to provide substantial energy with good efficiency and to be tunable continuously without mechanical complications and throughout a wide frequency band.

The oscillator according to the invention belongs to the class of tubes known in present day practice as travelling wave tubes. Such tubes comprise essentially an electron source capable of emitting an electron beam, which is caused to propagate from this source to a target, and a delay line in coupled relationship with the beam and along which a wave of high frequency energy is caused to propagate in the same direction as the beam. If the apparent or phase velocity of one of the components of this wave propagating from the source end of the delay line toward the target end thereof is substantially equal to and in the same direction as the velocity of the beam, interaction occurs between the beam and this wave, and the latter is amplified.

Some attempts have been made to operate these travelling wave tubes as oscillators, but they do not have a continuous tuning band throughout the range of frequencies for which the tubes are designed. Hence, they have been used mainly only as amplifiers.

According to the present invention, a tube of the travelling wave type is caused to operate as an oscillator tunable throughout a wide, uninterrupted frequency band. For this purpose, the tube is provided with a delay line which has a geometrically periodical structure, i.e. the shape of which is periodically repeated in space at regular intervals, and which is electrically aperiodical for the frequency band within which the tube is desgined to oscillate. Generally speaking, any delay line of geometrically periodical structure may be used which is capable of sustaining only travelling waves at least in a given band. This electrical aperiodicity may be obtained by substantially matching or adapting the line to suppress reflections of energy from the end of the line remote from the source, at least in the selected band, and in practice the line is provided, at least at the end thereof remote from the source of electrons, with means for absorbing the high frequency energy propagating in the same direction as the beam and which would otherwise be reflected from that end, while at the end adjacent to the source of electrons means are provided for collecting high frequency energy propagating backwards in the opposite direction to the beam and for transmitting it to a load or utilization circuit.

The operation of the tube according to the invention is based upon the interaction which will occur between the beam and the wave energy propagating in the delay line in the backward direction, i.e. in the opposite direction to the beam, when the apparent or phase velocity of one of the components of this wave is substantially equal to and in the same direction as the velocity of the beam.

Figure 4:
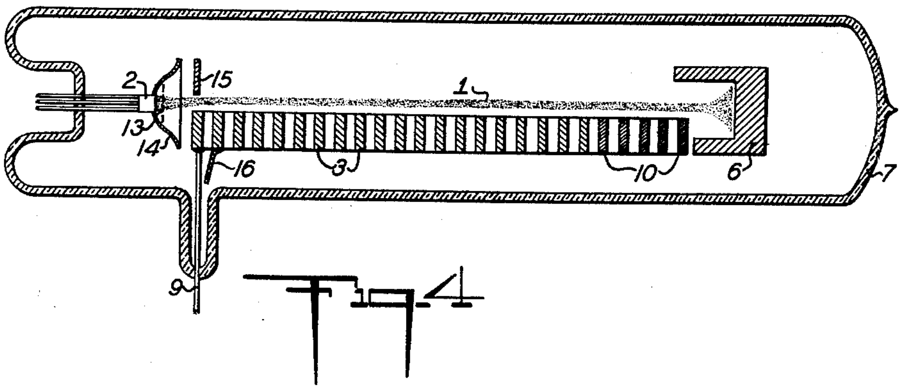
Figure 3:
Figure 2:
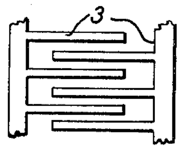

The invention will now be particularly described with reference to the appended drawings showing some embodiments thereof and wherein:

Figs. 1 and 4 are longitudinal sections of two tubes according to the invention; and Figs. 2 and 3 show two embodiments of delay lines among those which may be utilized in tubes according to the invention.

Referring now to the embodiment shown in Fig. 1, it may be seen that the oscillator according to the invention comprises essentially a tube of the travelling wave type, which may be for instance of rectilinear form. This tube comprises, within an evacuated envelope 7, electron emitting means such as a conventional electron gun 2, and a delay line 3 which may be of interdigital, zig-zag, helicoidal or other structure or which may comprise vanes or discs supported by a rod. The electron gun 2, the cathode of which is at a negative potential with respect to the line 3, provides, in a manner well known in the art, an electron beam 1 which propagates towards a target or collector 6 to which a positive potential $V_1$ with respect to the electron source is applied in a conventional manner.

According to a preferred embodiment shown in Fig. 1, electron optical means are provided in the form of crossed electrical and magnetic fields, perpendicular to each other and to the direction of travel of the beam, for directing and controlling the electron beam in the oscillator according to the invention. As described for instance in U.S. Patent No. 2,511,407, such an arrangement improves the operation of the beam in travelling wave tubes. While these fields are provided in the embodiment according to Fig. 1, they are not provided in the embodiment according to Fig. 4. In the embodiment shown in Fig. 1, the lines of force of the magnetic field are perpendicular to the sheet of drawings and are shown at 5 in a conventional way. The electric field, having its lines of force perpendicular to the beam and to the lines of force of the magnetic field, i.e., in the plane of the drawing is provided by a D.C. source $V_0$ which is applied to the line 3 and to an electrode 4 extending parallel thereto. This electrode 4 cooperates with the delay line 3 to define therebetween an interaction space for the electron beam and the wave travelling in the line.

Load circuit 8 located at the end of the delay line 3 adjacent the electron gun 2 is preferably matched with the delay line and is connected thereto by means of a connection 9. The delay line 3 is provided with attenuating means for absorbing any energy reflected by the load circuit 8. Such attenuating means may be inherent to the delay line 3, but in the embodiment shown in Fig. 1, it is in the form of an absorbing layer on the surface of a portion 10 of the line 3 at the end thereof remote from the load although it is also possible to match that end of the line by any other known, internal or external attenuating or absorbing means.

To cause the above described oscillator of Fig. 1, to oscillate applicant proceeds in the following manner:

Electron gun 2 is made to operate as also the source $V_0$ and the magnetic field 5, and beam 1 propagates from the gun 2 towards the target 6. This beam interacts with the high frequency energy which appears at the same moment in the delay line 3. How this energy appears will be described later. As a result of this interaction, high frequency waves propagate in that direction which, for the sake of simplicity, will be termed the positive direction, from the end of the delay line 3 remote from the gun 2 towards the end of the line 3 adjacent the gun 2, i.e. in the backward direction with respect to the beam 1 and to the usual propagation direction of normal travelling wave tubes. The energy thus provided is collected at 8 and fed for instance to an antenna or any load circuit.

The tuning of the oscillator is obtained by changing the propagation velocity of the beam. This may for instance be obtained in the embodiment shown in Fig. 1 more generally by varying the ratio of the electric field and the magnetic field or more specifically by varying the potential between the electrode or plate 4 and the line 3 by adjusting the potentiometer 12. By so proceeding, the frequency of the oscillator may be uninterruptedly varied at will within a bandwidth as large as 30 to 50% of the lowest frequency for which the tube is designed to operate, while according to present day practice oscillators capable of providing, without mechanical tuning, a bandwidth up to 1% of the lowest frequency were considered as very satisfactory.

Any means known in the art may be utilized to modulate the output of the oscillator. Amplitude modulation may be performed by amplitude modulating the beam 1, for instance by means of a grid provided in the path of this beam. Frequency modulation may be performed by applying a modulation voltage to the circuit providing the electric field as shown at 11 and as is well known in the art.

The invention is by no means limited to the shape of tube shown in Fig. 1. For example, the tube may be of circular form as described in U.S. Patent No. 2,511,407.

In the tube of Fig. 4, no means are provided for creating electrical or magnetic fields perpendicular to each other and to the beam. This tube comprises an emissive cathode 2, which provides the beam 1, a delay line 3 having for example an interdigital structure and an attenuator portion 10 which may be in any of the forms suggested in the case of Fig. 1, and a target or collector 6. The electron density is controlled by a grid 13. Further, conventional electron optical means are provided which comprise an accelerating anode 15 and a focusing electrode 14.

An output antenna 9 is coupled to the end of the delay line adjacent to the gun 2 and matching means 16 may be provided to match the antenna to the line.

If desired a longitudinal magnetic field may be provided by conventional means.

Oscillation of the tube of Fig. 4, is achieved in the same way as in the case of Fig. 1, and variation of the frequency of oscillation is obtained similarly by adjusting a potentiometer 12, not shown in Fig. 4.

While applicant believes that the following provides a satisfactory theoretical explanation of the way in which the tube of the invention operates, he does not wish to be bound thereby as the operative construction and utilization are not dependent upon such explanation.

It is known that if the delay line 3 is of geometrically periodical structure and is electrically aperiodical within the operating band of the tube, a flow of energy of a given frequency propagated along the line in a given direction may be considered as being formed by the superimposition of an infinity of progressive waves all having the same frequency but each having a different apparent or phase velocity and some being directed forwards and others backwards along the line. These waves are usually called space harmonics, some of which are termed positive because they are directed in the same direction as the flow of energy and the others of which are termed negative because they are directed in the opposite direction to the flow of energy in the line.

Furthermore, it is known that when a high frequency wave is propagating along the delay line of a conventional travelling wave tube and an electron beam is being emitted by the gun 2 in the direction of the target 6, interaction occurs between the beam and that space harmonic the apparent, delayed or phase velocity of which is substantially equal to the velocity of the electrons of the beam 1 and which is directed in the same direction. It is known that the desired velocity $v$ of the electrons may be obtained in the form of tube of Fig. 1 by adjusting either or both of the parameters represented by the electric and magnetic fields to appropriate values E in volts per meter and B in webers per square meter, since $$v=\frac{E}{B}$$

$v$ being in meters per second. In the form of tube of Fig. 4, the velocity $v$ of the electrons is determined by the formula $$v=\sqrt{\frac{2e}{m}V_0}$$

$e$ and $m$ being respectively the charge and the mass of an electron, and $V_0$ the voltage applied to the cathode and the line being the single adjustable parameter.

Now, if the velocity of the electrons of the beam is made substantially equal to the phase velocity of a negative space harmonic of high frequency electro-magnetic wave energy induced in the line by the noise inherently accompanying the electron beam, this space harmonic directed in the same direction as the beam, i.e. in the direction which may be termed the negative direction with respect to the flow of energy, interacts with the beam, and amplified energy is caused to flow in the positive or backward direction. This results in an increased energy flow towards the gun end of the delay line on the frequency for which interaction is obtained. This increased flow of energy further modulates the beam, giving rise to a further increased flow of energy and so on. If the beam current is large enough this internal feedback mechanism results in self-sustained oscillations on a frequency substantially determined by the velocity of the electrons for a delay line of given structure.

Figs. 2 and 3 show delay lines which are especially suitable for use in tubes according to the invention. The delay line of Fig. 2 is a symmetrical interdigital line and the delay line of Fig. 3 is a zig-zag line.

If the matching between the load and the line is perfect, a maximum transfer of energy is effected from the tube to the load. Even if, by reason of some mismatching, some reflection occurs, this takes place in the negative direction and absorption occurs at the end 10 so that there is no interaction thereof with the beam and there is no frequency pulling.

It should be specially noted that no coupling takes place between the ends of the delay line contrary to what takes place in the magnetron.

Thus it has been shown that the invention provides an uninterrupted wide band ultra high frequency oscillator operating on an internal feedback principle and the operation of which is not substantially affected insofar as frequency stability is concerned by the existence of some mismatching between the load and the delay line.

In order to explain more clearly the operation of the oscillators according to the invention, the structure and function may be summarized as follows.

When R.F. energy travels along a periodic structure, the associated electromagnetic fields are composed of an infinite series of traveling space harmonic waves. Some of these waves travel in a direction opposite to the direction of energy flow. If an electron beam is sent in the direction of one of these opposite traveling waves, at a velocity synchronous with the phase velocity of the wave, interaction will take place between the beam and the wave, and the beam will give energy to the wave. Since the beam and the wave are traveling in the same direction, the energy given to the wave travels toward the source of the beam, modulating the beam in its earlier stages. When the beam current is sufficiently great this action becomes self sustaining and oscillation occurs. The frequency of oscillation is such that the velocity of the interacting wave is just equal to the velocity of the electron stream. If the beam velocity is varied the frequency of oscillation will also vary so that the wave velocity always is equal to that of the electron stream.

In both types of tube illustrated by Figures 1 and 4, changing the anode voltage will change the frequency of oscillation. This frequency, therefore, varies with the velocity of the electrons in the interaction space in accordance with the dispersion curve of the delay line used in the tube. The shape of this curve may be modified by the choice of the parameters defining the geometrical structure of the delay line having a periodical structure. If the dispersion of this delay line is relatively low, i.e. if the phase velocity of the wave interacting with the electrons varies relatively little with the wave-length, the oscillators according to the invention will have a wide electronic tuning band.

The arrangement characterizing the invention, namely a delay line having a periodical geometrical structure provided, on the one hand, with means for extracting ultra-high frequency electromagnetic energy positioned at that end of the line near which the electrons enter the interaction space, and, on the other hand, with attenuating means positioned at the other end of the line near which the electrons are collected, has for its result, as stated above, that the energy given to the wave by the beam travels toward the electron gun. It is extracted at the end of the delay near the gun and fed to the load.

This arrangement will determine two important features as follows:

(*a*) The frequency of operation is not affected by load condition. In other words, the tube has no frequency pulling, and is not subject to long lines effects.

(*b*) The power reaching the load is diminished only by the power reflection factor of the mismatch.

The invention is not limited to the two types of line shown in Figures 2 and 3, but may comprise a delay line of any periodical geometrical structure capable of fulfilling the operating conditions described above.

I claim:

1. An ultra high frequency tube, said tube comprising a delay line having a geometrically periodical structure, an electron emissive source adjacent one end of said line and positioned to emit a beam of electrons in coupled relationship with said line thereby to induce electromagnetic wave energy in said line and to interact with a space harmonic thereof, said line having its two ends mutually uncoupled, means disposed at least at the other end of said line for absorbing ultra high frequency energy propagated along said line in the same direction as the beam thereby substantially to prevent reflections from said other end and thus to render said line electrically aperiodic within the limits of said band, means for directing said beam of electrons along a path substantially parallel to said line and at a velocity substantially equal to the apparent or phase velocity of a negative space harmonic of said electromagnetic wave energy propagating in said line in the opposite direction to the beam, thereby to cause interaction between said beam and said negative space harmonic for sustained flow of energy toward said electron emissive source, and means coupled to said line for transferring said energy to an external load circuit.

2. An ultra high frequency discharge device adapted to produce oscillations of a frequency which is adjustable at will over a relatively wide, uninterrupted band, said tube comprising a delay line having a geometrically periodical structure having effectively two ends, an electron emissive source adjacent one end of said line and positioned to emit a beam of electrons in coupled relationship with said line thereby to induce electromagnetic wave energy in said line and to interact with a space harmonic thereof, said line having its two ends mutually uncoupled, means disposed at least at the other end of said line for absorbing ultra high frequency energy propagated along said line in the same direction as the beam thereby substantially to prevent reflections from said other end and thus to render said line electrically aperiodic within the limits of said band, means for directing said beam of electrons along a path substantially parallel to said line and at a velocity substantially equal to the apparent or phase velocity of a negative space harmonic of electromagnetic wave energy propagating in said line in the opposite direction to the beam, thereby to cause interaction between said beam and said negative space harmonic for sustained flow of energy toward said electron emissive source, and means coupled to said line for transferring said energy to an external load circuit.

3. A microwave oscillator comprising an electron source and a collector electrode defining therebetween a path of electron flow, a wave guiding structure positioned along said path in which there is induced by the electron flow an electromagnetic wave which travels in a direction opposite that of the electron flow, accelerating means for varying the velocity of the electron flow and changing the frequency of the induced wave, absorbing means near one end of said wave guiding structure to minimize reflections therefrom, and means coupled to said wave guiding structure for abstracting the induced wave.

4. A microwave oscillator according to claim 3, wherein said absorbing means is operatively connected with the end of said wave guiding structure adjacent said collector electrode.

5. An ultra high frequency electron discharge tube comprising a delay line having a geometrically periodical structure adapted to propagate therealong electromagnetic wave energy, electron emissive means operative to produce a flow of electrons in coupled relationship with said delay line thereby to interact with a space harmonic of the electromagnetic wave energy in said line, said line having effectively two ends, means for directing said flow of electrons along paths adjacent to said line and at a velocity substantially equal to the apparent or phase velocity of a negative space harmonic of said electromagnetic wave energy propagating in said line in the opposite direction to the flow of said electrons, thereby to cause interaction between said electrons and said negative space harmonic for sustained flow of said electromagnetic wave energy in the said opposite direction, and means coupled to said line for transferring to an external load circuit said electromagnetic wave energy.

6. A traveling wave, ultra high frequency electron discharge device adapted to produce oscillations of a frequency which is adjustable at will over a relatively wide band, said tube comprising cathode means for producing an electron flow moving along a predetermined path, a wave guiding structure positioned along said path in which there is induced by said electron flow an electromagnetic wave which travels in a direction opposite that of electron flow, and means coupled to said wave guiding structure for abstracting the induced wave.

7. A microwave oscillator comprising an electron source and a collector electrode defining therebetween a path of electron flow, a wave guiding structure positioned along said path in which there is induced by the electron flow an electromagnetic wave which travels in a direction opposite that of the electron flow, accelerating means for varying the velocity of the electron flow and changing the frequency of the induced wave, means operatively connected with said wave guiding structure to minimize reflections in said wave guiding structure, and means coupled to said wave guiding structure for abstracting the induced wave.

8. An ultra high frequency electron discharge tube comprising a delay line having a geometrically periodical structure adapted to propagate therealong electromagnetic wave energy, electron emissive means operative to produce a flow of electrons in coupled relationship with said delay line thereby to interact with a space harmonic of the electromagnetic wave energy in said line, said line having effectively two ends, means for directing said flow of electrons along paths adjacent to said line and at a velocity substantially equal to the apparent or phase velocity of a negative space harmonic of said electromagnetic wave energy propagating in said line in the opposite direction to the flow of said electrons, thereby to cause interaction between said electrons and said negative space harmonic for sustained flow of said electromagnetic wave energy in the said opposite direction, means operatively connected with said line for absorbing ultra high frequency energy propagated therealong in the same direction as said flow of electrons, and means coupled to said line for transferring to an external load circuit said electromagnetic wave energy.

9. An ultra high frequency oscillator tube adapted to produce oscillations of a frequency which is adjustable at will over a relatively wide band, said tube comprising a wave-guiding structure having effectively a first end and a second end, cathode means for emitting electrons adapted to propagate from said first end toward said second end along said wave-guiding structure in coupled relationship therewith to thereby induce electromagnetic wave energy in said wave-guiding structure and to interact with a space harmonic thereof, means for directing said electrons to propagate along said wave-guiding structure in coupled relationship therewith in a direction from said first end toward said second end of said wave-guiding structure and at a velocity substantially equal to the apparent or phase velocity of a negative space harmonic of the electromagnetic wave energy propagating in said wave-guiding structure in the opposite direction to the flow of said electrons, thereby to cause interaction between said electrons and said negative space harmonic for sustained flow of energy toward said cathode means, and means operatively connected to said wave-guiding structure for transferring said energy to an external load circuit.

10. A travelling-wave, ultra high frequency electron discharge device adapted to produce oscillations of a frequency which is adjustable at will over a relatively wide band, said tube comprising a wave-guiding structure having effectively a first end and a second end, cathode means in said system for emitting electrons adapted to propagate from said first end toward said second end along said wave-guiding structure in coupled relationship therewith to thereby induce electromagnetic wave energy in said wave-guiding structure and to interact with a space harmonic thereof, means for directing said electrons to propagate along said wave-guiding structure in coupled relationship therewith in a direction from said first end toward said second end of said wave-guiding structure and at a velocity substantially equal to the apparent or phase velocity of a negative space harmonic of the electromagnetic wave energy propagating in said wave-guiding structure in the opposite direction to the flow of said electrons, thereby to cause interaction between said electrons and said negative space harmonic for sustained flow of energy toward said cathode means, and means operatively connected to said wave-guiding structure for transferring said energy to an external load circuit.

11. In microwave apparatus, a transmission circuit for propagating electromagnetic wave energy, means for producing an electron stream past said transmission circuit in a direction opposite to that of propagation of the electromagnetic wave energy and at a velocity for interaction with said wave energy, and output means coupled to said transmission circuit for abstracting said electromagnetic wave energy for utilization.

12. In microwave apparatus, a transmission path for propagating electromagnetic waves, means for producing an electron stream along said path at a velocity for interaction with electromagnetic wave energy travelling upstream along said path, termination means along said path for absorbing electromagnetic wave energy travelling downstream along said path, and output means operatively connected with said path for abstracting said electromagnetic wave energy travelling upstream along said path.

13. A microwave oscillator comprising an electron source and a collector electrode defining therebetween a path of electron flow, a wave guiding structure positioned along said path in which there is induced by the electron flow an electromagnetic wave which travels in a direction opposite that of electron flow, accelerating means for varying the velocity of the electron flow and changing the frequency of the induced wave, and means coupled to the said wave guiding structure for abstracting the induced wave.

14. An electron discharge device comprising an electron source and a target electrode defining a path of unidirectional electron flow, a wave-guiding structure for propagating high-frequency waves along said path in a direction opposite to that of electron flow and in interacting relationship with the electrons therein, and output coupling means for said waves operatively connected with said wave-guiding structure.

15. In an electron discharge device, an electron source and a target electrode defining therebetween a path of unidirectional electron flow, a wave-guiding structure which comprises a plurality of iterative sections positioned along said path and operative to propagate signal waves upstream along said structure in interacting relationship with electrons in said path of flow, and output coupling means operatively connected with said structure for deriving said waves, said output coupling means being situated between said electron source and said target electrode.

No references cited.